(12) United States Patent
Nolan

(10) Patent No.: US 12,231,027 B2
(45) Date of Patent: Feb. 18, 2025

(54) CHAIN-LINK CONVERTERS

(71) Applicant: General Electric Technology GmbH, Baden (CH)

(72) Inventor: Andrew Nolan, Stafford (GB)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 282 days.

(21) Appl. No.: 17/998,739

(22) PCT Filed: May 28, 2021

(86) PCT No.: PCT/EP2021/064361
§ 371 (c)(1),
(2) Date: Nov. 14, 2022

(87) PCT Pub. No.: WO2021/244969
PCT Pub. Date: Dec. 9, 2021

(65) Prior Publication Data
US 2023/0336067 A1    Oct. 19, 2023

(30) Foreign Application Priority Data

Jun. 4, 2020 (EP) .................................. 20275100

(51) Int. Cl.
*H02M 7/483* (2007.01)
*H02M 1/00* (2006.01)

(52) U.S. Cl.
CPC ....... *H02M 1/0009* (2021.05); *H02M 7/4835* (2021.05)

(58) Field of Classification Search
CPC ....... H02M 7/4835; H02M 1/0009; H02J 3/36
See application file for complete search history.

(56) References Cited

U.S. PATENT DOCUMENTS 10,473,728 B2 * 11/2019 Goetz ................. H02M 7/4835
2023/0335994 A1 * 10/2023 Kumar ................. H02J 3/1842

FOREIGN PATENT DOCUMENTS

| CN | 105186460 B | 10/2017 |
|---|---|---|
| WO | 2017207045 A1 | 12/2017 |

OTHER PUBLICATIONS

D. Li, A. Ukil, K. Satpathi and Y. M. Yeap, "Hilbert-Huang Transform Based Transient Analysis in Voltage Source Converter Interfaced Direct Current System," in IEEE Transactions on Industrial Electronics, vol. 68, No. 11, pp. 11014-11025, Nov. 2021, (Year: 2021).*

(Continued)

*Primary Examiner* — Peter M Novak
(74) *Attorney, Agent, or Firm* — Eversheds Sutherland (US) LLP

(57) ABSTRACT

A chain-link converter includes a number of series-connected chain-link modules. Each chain-link module has a module controller that is programmed to control operation of the corresponding chain-link module to selectively provide a voltage source, whereby the chain-link converter is able to provide a stepped variable voltage source. The chain-link converter also includes a chain-link converter controller that is arranged in communication with each module controller, and which is programmed to, in-use, communicate to a number of the module controllers a measured converter current ($I_{DC}$) that is flowing through the chain-link converter. The module controllers that receive the measured converter current ($I_{DC}$) is each further programmed, in-use, to combine the measured converter current ($I_{DC}$) with a measured rate of change of current ($I_{AC}$) flowing through the corresponding chain-link module, to establish an instantaneous module current ($I_i$) that is flowing through the corresponding chain-link module.

11 Claims, 1 Drawing Sheet

(56) References Cited

OTHER PUBLICATIONS

International Search Report and Written Opinion in PCT/EP2021/064361 dated Jul. 23, 2021 (16 pages).
Mocevic et al.: Phase Current Sensor and Short-Circuit Detection based on Rogowski Coils Integrated on Gate Driver for 1.2 kV SiC MOSFET Half-Bridge Module. 2018 IEEE Energy Conversion Congress and Exposition (ECCE), 2018, pp. 393-400.
Karrer et al.: A new current measuring principle for power electronic applications. 11th International Symposium on Power Semiconductor Devices and ICs. ISPSD'99 Proceedings (Cat. No.99CH36312), 1999, pp. 279-282.

\* cited by examiner

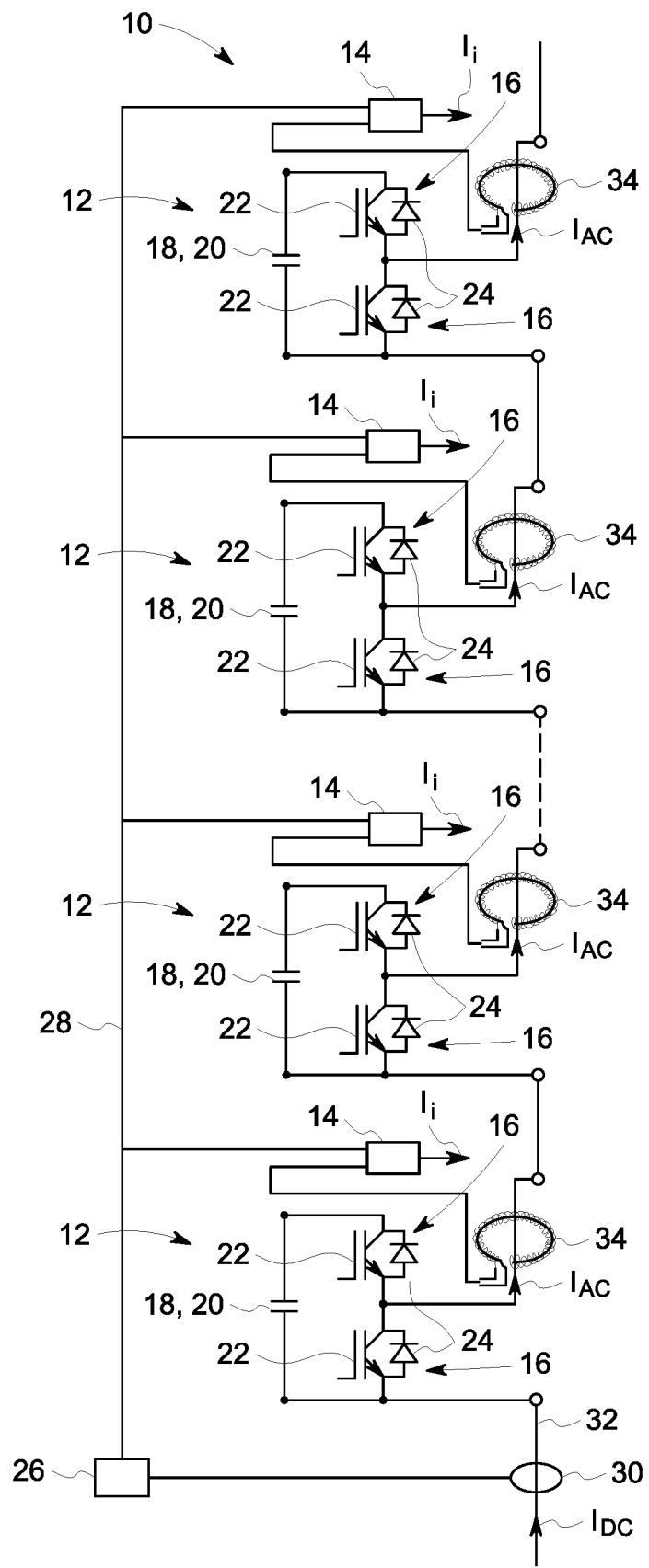

CHAIN-LINK CONVERTERS

CROSS-REFERENCE TO RELATED APPLICATIONS

This application is a U.S. National Stage Application under 35 U.S.C. § 371 and claims the priority to International Application No. PCT/EP2021/064361, filed May 28, 2021, which claims priority to European Application No. 20275100.4, filed Jun. 4, 2020, both of which are incorporated herein by reference.

TECHNICAL FIELD

This invention relates to a chain-link converter, the chain-link converter including a plurality of series-connected chain-link modules, each chain-link module having a module controller programmed to control operation of the corresponding chain-link module to selectively provide a voltage source whereby the chain-link converter is able to provide a stepped variable voltage source. In addition, the invention relates to a method of operating such a chain-link converter.

BACKGROUND OF THE INVENTION

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

One type of power converter is a voltage source converter, although other types of power converter are also possible.

Such a voltage source converter includes first and second DC terminals between which extends at least one converter limb, and typically three converter limbs each of which corresponds to a given phase of a three-phase electrical power system.

The or each converter limb includes first and second limb portions which are separated by an AC terminal.

In use the first and second DC terminals are connected to a DC network, and the or each AC terminal is connected to a corresponding phase of an AC network.

Each limb portion includes a chain-link converter which extends between the associated AC terminal and a corresponding one of the first or the second DC terminal. Each chain-link converter includes a plurality of series connected chain-link modules, while each chain-link module includes a number of switching elements which are connected in parallel with an energy storage device, usually in the form of a capacitor. Other types of energy storage device, i.e. any device that is capable of storing and releasing energy to selectively provide a voltage, e.g. a fuel cell or battery, may also be used however.

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms.

For example, operation of each chain-link converter in the foregoing manner can be used to generate an AC voltage waveform at the or each AC terminal, and thereby enable the voltage source converter to provide the aforementioned power transfer functionality between the AC and DC networks.

SUMMARY OF THE INVENTION

According to a first aspect of the invention there is provided a chain-link converter comprising:
  a plurality of series-connected chain-link modules, each chain-link module having a module controller programmed to control operation of the corresponding chain-link module to selectively provide a voltage source whereby the chain-link converter is able to provide a stepped variable voltage source; and
  a chain-link converter controller arranged in communication with each module controller and programmed to in-use communicate to a plurality of module controllers a measured converter current flowing through the chain-link converter,
  the module controllers receiving the measured converter current each being further programmed in-use to combine the measured converter current with a measured rate of change of current flowing through the corresponding chain-link module to establish an instantaneous module current flowing through the said corresponding chain-link module.

The provision of such a chain-link converter controller, and such module controllers, allows the chain-link converter of the invention to utilise a single converter current measuring device, which is expensive and able to operate only at a relatively low frequency, but nevertheless is highly accurate, along with another measuring device that is able to operate at a higher measuring frequency and is far less expensive, so can be deployed on multiple chain-link modules, but which is only sensitive to rapid changes in current flow, and so is unable to provide an ongoing indication of current flow during steady-state conditions, and nevertheless combine the output of both such measuring devices to establish an instantaneous module current flowing through a given chain-link module which, in turn, is extremely useful for assisting in controlling and protecting the given chain-link module.

In particular, such an arrangement allows each of the given chain-link modules to be operated closer to their rated current operating characteristic because any increase in current flow through such a chain-link module which is occasioned by a fault, can be swiftly detected and the actual, instantaneous module current flowing through the said chain-link module readily established in order that protective measures, if necessary, can be similarly rapidly deployed. As a consequence of being able to safely operate such chain-link modules closer to their rating, any voltage source converter in which they are incorporated needs to include fewer such chain-link modules in order to provide a given power transfer capability which, in turn, allows such voltage source converters to be provided more cost effectively.

Preferably each of the module controllers receiving the measured converter current is programmed to establish an instantaneous module current by using the measured converter current as a base line current measurement and adding to that an integrated current measurement derived from the measured rate of change of current flowing through the corresponding chain-link module.

In this way, the chain-link converter is able to make use of a precise current measurement at a known time in the recent past, i.e. the measured converter current, and a high bandwidth current measurement that is established very shortly after that reference point in the recent past and which does not suffer from delays because it is made locally at the chain-link module, i.e. the integrated current measurement derived from the measured rate of change of current flowing through the chain-link module, to establish, e.g. calculate, an extremely accurate instantaneous module current.

In a preferred embodiment of the invention each of the module controllers receiving the measured converter current is additionally programmed to compare a latest received measured converter current with the established instantaneous module current and to adjust measurement of the rate of change of current flowing through the corresponding chain-link module if there is a discrepancy between the latest received measured converter current and the established instantaneous module current.

Having module controllers additionally programmed in the aforementioned manner helps to improve the accuracy of the established instantaneous module current over time, e.g. using an iterative process.

The chain-link converter controller may be additionally programmed to take protective action if the measured converter current exceeds a predetermined safe converter threshold.

Preferably each module controller is additionally programmed to take protective action if the instantaneous module current it establishes deviates from one or more predetermined parameters.

Deviation from a predetermined parameter may include at least one of:
the instantaneous module current exceeding a predetermined safe module threshold which is greater than the predetermined safe converter threshold; and
the instantaneous module current increasing at a rate greater than a predetermined safe rate.

Such features help to ensure that the chain-link converter of the invention is protected, e.g. is blocked and disconnected from any energy sources with which it is, in use, connected, in the event that a higher than normal fault current arises.

Moreover, having each module controller programmed in the aforementioned manner, along with careful selection of the associated predetermined parameters, means that the protection provided by the chain-link converter controller takes precedence over the protection provided by each module controller. This is desirable because the chain-link converter controller is thereby able to continue providing coordinated protection of the converter, e.g. in the case of modest overcurrent fault events, while the module controllers are able to react to more extreme and faster occurring fault events.

In another preferred embodiment of the invention each module controller is further programmed to report the need for it to take protective action to the chain-link converter controller, which in turn is further programmed to monitor the number of module controllers providing such a report.

In a still further preferred embodiment of the invention the chain-link converter controller (26) is still further programmed to at least one of:
instruct the or each module controller providing a report of the need to take protective action to avoid taking protective action if fewer than a predetermined number of module controllers provide such a report; and
initiate blocking of the chain-link converter and/or blocking of a voltage source converter within which the chain-link converter is in-use located, if the predetermined number or greater of module controllers (14) provides such a report.

The inclusion of such features enables the chain-link converter controller to determine whether one or more module controllers is operating spuriously, e.g. in the event that only one or a small number of module controllers report the need to take protective action, and thereby avoid an unnecessary and inconvenient shut down of the chain-link converter or a voltage source converter within which the chain-link converter is, in use, located, in the case of such malfunctioning by one or a few module controllers.

Optionally the chain-link converter further includes at least one current transformer to provide the measured converter current flowing through the chain-link converter.

Having a current transformer provide the measured converter current helps to ensure that the measured current is accurate and precise to the degree needed for the associated operation of the module controllers which receive this measurement.

Each chain-link module having a module controller that receives the measured converter current may also include a current measurement transducer to provide the measured rate of change of current flowing through the corresponding said chain-link module.

Current measurement transducers have a high bandwidth, i.e. are able to operate at a high frequency, and so are advantageously able to measure very rapid changes in current flow, e.g. such as might arise in certain types of fault.

In addition, the provision of such transducers also means that a fault current flowing in a path that does not include the above-mentioned current transformer, and so which ordinarily would not be picked up by such a current transformer, can nevertheless still be detected by one or more such transducers, thereby allowing appropriate protective action to be taken.

According to a second aspect of the invention there is provided a method of operating a chain-link converter comprising a plurality of series-connected chain-link modules, each chain-link module having a module controller programmed to control operation of the corresponding chain-link module to selectively provide a voltage source whereby the chain-link converter is able to provide a stepped variable voltage source, and a chain-link converter controller arranged in communication with each module controller, the method comprising the steps of:
(a) having the chain-link converter controller communicate to a plurality of module controllers a measured converter current flowing through the chain-link converter; and (b) having the module controllers which receive the measured converter current combine the measured converter current with a measured rate of change of current flowing through the corresponding chain-link module to establish an instantaneous module current flowing through the said corresponding chain-link module.

The method of the invention shares the benefits of the corresponding features of the chain-link converter of the invention.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWING

There now follows a brief description of preferred embodiments of the invention, by way of non-limiting example, with reference being made to FIG. 1 which shows a schematic view of a portion of a chain-link converter according to a first embodiment of the invention.

DETAILED DESCRIPTION

A portion of a chain-link converter according to a first embodiment of the invention is designated generally by reference numeral 10, as shown in FIG. 1.

In particular, although the chain-link converter 10 of the invention includes sixty-four, series-connected chain-link modules 12, only four are shown in FIG. 1. In other embodiments of the invention, however, the chain-link converter may include fewer than or more than sixty-four chain-link modules.

In any event, each chain-link module 12 has a module controller 14 that is programmed to control operation of the corresponding chain-link module 12 to selectively provide a voltage source, whereby the chain-link converter 10 is able to provide a stepped variable voltage source.

More particularly, each chain-link module 12 includes a number of switching elements 16 which are connected in parallel with an energy storage device 18 in the form of a capacitor 20. Other types of energy storage device, i.e. any device that is capable of storing and releasing energy to selectively provide a voltage, e.g. a fuel cell or battery, may also be used however.

Each switching element 16 includes a semiconductor device in the form of an Insulated Gate Bipolar Transistor (IGBT) 22, although other types of self-commutated semiconductor devices, such as a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT), or any other self-commutated switching device may be used instead. In addition, one or more of the semiconductor devices may instead include a wide-bandgap material such as, but not limited to, silicon carbide, boron nitride, gallium nitride and aluminium nitride.

The number of semiconductor devices in each switching element 16 may vary depending on the required voltage and current ratings of that switching element 16.

Each of the switching elements 16 also includes a passive current check element, which in the embodiment shown takes the form of a diode 24, that is connected in anti-parallel with a corresponding semiconductor device. In other embodiments of the invention the passive current check element may include another type of passive current check device, i.e. any device that is capable of limiting current flow in only one direction. In addition, the number of passive current check devices in each passive current check element may vary depending on the required voltage and current ratings of that passive current check element.

The chain-link module 12 shown is a first exemplary chain-link module which includes a first pair of switching elements 16 that is connected in parallel with a capacitor 20 in a known half-bridge arrangement to define a 2-quadrant unipolar module. Switching of the switching elements 16 selectively directs current through the capacitor 20 or causes current to bypass the capacitor 20, such that the first exemplary chain-link module 12 can provide zero or positive voltage and can conduct current in two directions.

A second exemplary chain-link module (not shown) includes first and second pairs of switching elements and a capacitor that are connected in a known full bridge arrangement to define a 4-quadrant bipolar module. In a similar manner to the first exemplary chain-link module, switching of the switching elements again selectively directs current through the capacitor or causes current to bypass the capacitor such that the second exemplary chain-link module can provide zero, positive or negative voltage and can conduct current in two directions.

The chain-link converter 10 shown includes solely first exemplary chain-link modules 12, but in other embodiments of the invention the chain-link converter may include solely second exemplary chain-link modules, or a combination of first and second exemplary chain-link modules.

In any event, the provision of a plurality of chain-link modules 12 means that it is possible to build up a combined voltage across the chain-link converter 10, via the insertion of the energy storage devices, i.e. the capacitors 20, of multiple chain-link modules 12 (with each chain-link module 12 providing its own voltage), which is higher than the voltage available from each individual chain-link module 12.

Accordingly, each of the chain-link modules 12 work together to permit the chain-link converter 10 to provide a stepped variable voltage source. This permits the generation of a voltage waveform across the chain-link converter 10 using a step-wise approximation. As such the chain-link converter 10 is capable of providing a wide range of complex waveforms which, when combined with other chain-link converters to define a voltage source converter, permits a conversion between AC and DC power.

Returning to the embodiment shown, the chain-link converter 10 also includes a chain-link converter controller 26 that is arranged in communication with each module controller 14, and more particularly is arranged in communication with each module controller 14 via a passive optical network 28, although other communication conduits may be used.

The chain-link converter 10 still further includes a current transformer 30, and more particularly a DC current transformer, which, in the embodiment shown, is mounted on a busbar 32, i.e. mounted on a main electrical conduction conduit that, in use, interconnects the chain-link converter 10 with an external DC or AC network. In any event, the current transformer 30 measures a converter current $I_{DC}$ that flows into (or out of), i.e. through, the chain-link converter 10, and passes that measurement to the chain-link converter controller 26. This may be via the aforementioned passive optical network 28, but could also be via some other equipment such as a protection system or other control system.

In addition, each chain-link module 12 includes a current measurement transducer, which in the embodiment shown takes the form of a Rogowski coil 34, that measures a rate of change of current $I_{AC}$ flowing through the associated chain-link module 12. Other types of current measurement transducer may, however, be used, and not all of the chain-link modules 12 need necessarily include such a transducer.

In use, the chain-link converter controller 26 is programmed to communicate to each of module controller 14 the measured converter current $I_{DC}$ that it receives from the current transformer 30. Such communication takes place across the passive optical network 28, and represents only a small overhead increase in the usual individual control commands sent by the converter controller 26 to each module controller 14 over this medium. This is because the same measured converter current $I_{DC}$ is broadcast to each module controller 14. The passive optical network 28 typically allows communication at a frequency of approximately 10 kHz and this, together with bandwidth of the current transformer 30, means that in practical terms an updated measured converter current $I_{DC}$ can be provided by the converter controller 26 to each module controller 14 approximately every 100 μs.

In other embodiments of the invention, the converter controller may not necessarily communicate the measured converter current to each module controller. For example, if the corresponding chain-link module within which one or more module controllers is located does not additionally include a current measurement transducer, e.g. a Rogowski coil, the converter controller may not communicate the measured converter current to those module controllers.

Meanwhile, returning to the embodiment shown, each of the module controllers 14 that receives the measured converter current $I_{DC}$, i.e. all of the module controllers 14 in the embodiment shown, is further programmed to, in use, combine the measured converter current $I_{DC}$ (which it receives from the converter controller 26) with the measured rate of change of current $I_{AC}$ flowing through the chain-link module 12 within which it is located (which each module controller 14 receives from the corresponding Rogowski coil 34), to establish an instantaneous module current $I_i$ that is flowing through the said chain-link module 12.

More particularly, each module controller 14 is programmed to establish such an instantaneous module current $I_i$ by using the measured converter current $I_{DC}$ as a base line current measurement and adding to that an integrated current measurement that is derived from the measured rate of change of current $I_{AC}$ that is flowing through the corresponding chain-link module 12. In other embodiments of the invention, one or more of the module controllers may be programmed to add a directly measured rate of change of current flowing through the corresponding chain-link module to the base line current measurement to establish an instantaneous module current.

In addition to the foregoing, each of the module controllers 14 is also programmed to compare a latest received measured converter current $I_{DC}$ with the established instantaneous module current $I_i$ and to adjust measurement of the rate of change of current $I_{AC}$ flowing through the corresponding chain-link module if there is a discrepancy between the latest received measured converter current $I_{DC}$ and the established instantaneous module current $I_i$. One way in which each module controller 14 may adjust such measurement is by altering the calibration of the Rogowski coil 34, e.g. by using proportional integral control.

It follows that the chain-link converter 10 of the invention is able to make use of a precise current measurement at a known time in the recent past, i.e. the measured converter current $I_{DC}$, and a high bandwidth current measurement that is established very shortly after that reference point in the recent past and which does not suffer from delays because it is made locally at the chain-link module 12, i.e. the integrated current measurement derived from the measured rate of change of current $I_{AC}$ flowing through the chain-link module 12, to establish, e.g. calculate, an extremely accurate instantaneous module current $I_i$.

Thereafter, the chain-link converter 10 of the invention is able to utilise that extremely accurate instantaneous module current $I_i$ to protect both itself and any voltage source converter within which it is, in use, located from a range of different fault conditions.

More particularly, the converter controller 26 is additionally programmed to take protective action if the measured converter current $I_{DC}$ exceeds a predetermined safe converter threshold. Such a predetermined safe converter threshold might typically be of the order of 2000 A (although this will vary according to specific chain-link converter designs), and the protective action the converter controller 26 might take in those circumstances is to block the whole of a voltage source converter in which the chain-link converter 10 is located, and disconnect the said voltage source converter from any energy sources with which it is connected.

Also, each module controller 14 is additionally programmed to take protective action if the instantaneous module current $I_i$ it establishes deviates from one or more predetermined parameters. Such deviation from a predetermined parameter includes:

if the instantaneous module current $I_i$ exceeds a predetermined safe module threshold, which is greater than the aforementioned predetermined safe converter threshold; and if the instantaneous module current increases at a rate greater than a predetermined safe rate.

In this regard, the predetermined safe module threshold is typically of the order of 3000 A, while a predetermined safe rate of instantaneous module current $I_i$ increase is usually a few amps per microsecond, e.g. about 5 A, per microsecond (although again, this will vary according to the specific design of the chain-link converter). In each case, the protective action taken by a given module controller 14, should such deviation arise, is similarly to instigate blocking the whole of a voltage source converter in which the chain-link converter 10 is located, and the disconnecting of the said voltage source converter from any energy sources with which it is connected.

It follows that, with careful selection of the associated predetermined parameters mentioned above, the protection provided by the converter controller 26 takes precedence over the protection provided by each module controller 14, with the converter controller 26 continuing to provide coordinated protection of the chain-link converter 10, e.g. in the case of modest overcurrent fault events, while the module controllers 14 react to more extreme and faster occurring fault events.

Each module controller 14 is still further programmed to report the need for it to take protective action to the converter controller 26. In turn, the converter controller 26 is further programmed to monitor the number of module controllers 14 providing such a report, and to instruct the or each module controller 14 providing such a report to avoid taking protective action if fewer than a predetermined number of module controllers 14 provide such a report. A predetermined number of such module controllers 14 could be as low as only two or three, although this can vary depending on the operating environment and controller parameters of the voltage source converter in which the chain-link converter 10 is, in use, located. In other embodiments of the invention, the converter controller may be additionally further programmed to instigate blocking of the chain-link converter, and/or blocking of the whole of a voltage source converter in which the chain-link converter is located, if the predetermined number of module controllers or greater reports the need to take protective action.

I claim:

1. A chain-link converter comprising:
a plurality of series-connected chain-link modules, each chain-link module having a module controller programmed to control operation of the corresponding chain-link module to selectively provide a voltage source whereby the chain-link converter is able to provide a stepped variable voltage source; and
a chain-link converter controller arranged in communication with each module controller and programmed to in-use communicate to a plurality of module controllers a measured converter current flowing through the chain-link converter;
the module controllers receiving the measured converter current each being further programmed in-use to combine the measured converter current with a rate of change of current flowing through and measured in the corresponding chain-link module to establish an instantaneous module current flowing through the corresponding chain-link module.

2. A chain-link converter according to claim 1, further including at least one current transformer to provide the measured converter current flowing through the chain-link converter.

3. A chain-link converter according to claim 1, wherein each chain-link module having a module controller that receives the measured converter current also includes a current measurement transducer to provide the measured rate of change of current flowing through the corresponding said chain-link module.

4. A chain-link converter according to claim 1, wherein each of the module controllers receiving the measured converter current is programmed to establish an instantaneous module current by using the measured converter current as a base line current measurement and adding to that an integrated current measurement derived from the measured rate of change of current flowing through the corresponding chain-link module.

5. A chain-link converter according to claim 1, wherein each of the module controllers receiving the measured converter current is additionally programmed to compare a latest received measured converter current with the established instantaneous module current and to adjust measurement of the rate of change of current flowing through the corresponding chain-link module if there is a discrepancy between the latest received measured converter current and the established instantaneous module current.

6. A chain-link converter according to claim 1, wherein the chain-link converter controller is additionally programmed to take protective action if the measured converter current (IDC) exceeds a predetermined safe converter threshold.

7. A chain-link converter according to claim 6, wherein each module controller is further programmed to report the need for it to take protective action to the chain-link converter controller, which in turn is further programmed to monitor the number of module controllers providing such a report.

8. A chain-link converter according to claim 7, wherein the chain-link converter controller is still further programmed to at least one of:
instruct the or each module controller providing a report of the need to take protective action to avoid taking protective action if fewer than a predetermined number of module controllers provide such a report; and
initiate blocking of the chain-link converter and/or blocking of a voltage source converter within which the chain-link converter is in-use located, if the predetermined number or greater of module controllers provides such a report.

9. A chain-link converter according to claim 1, wherein each module controller is additionally programmed to take protective action if the instantaneous module current (Ii) it establishes deviates from one or more predetermined parameters.

10. A chain-link converter according to claim 9, wherein deviation from a predetermined parameter includes at least one of:
the instantaneous module current exceeding a predetermined safe module threshold which is greater than the predetermined safe converter threshold; and
the instantaneous module current increasing at a rate greater than a predetermined safe rate.

11. A method of operating a chain-link converter comprising a plurality of series-connected chain-link modules, each chain-link module having a module controller programmed to control operation of the corresponding chain-link module to selectively provide a voltage source whereby the chain-link converter is able to provide a stepped variable voltage source, and a chain-link converter controller arranged in communication with each module controller,
the method comprising the steps of:
(a) having the chain-link converter controller communicate to a plurality of module controllers a measured converter current lowing through the chain-link converter; and
(b) having the module controllers which receive the measured converter current combine the measured converter current with a rate of change of current flowing through and measured in the corresponding chain-link module to establish an instantaneous module current flowing through the said corresponding chain-link module.

* * * * *